US011662093B2

(12) United States Patent
Maendel

(10) Patent No.: US 11,662,093 B2
(45) Date of Patent: May 30, 2023

(54) SYSTEM FOR REMOVING PARTICULATE MATTER FROM BIOMASS COMBUSTION EXHAUST GAS COMPRISING GAS CYCLONES AND BAGHOUSES

(71) Applicant: Triple Green Products Inc., Morris (CA)

(72) Inventor: David Maendel, Headingley (CA)

(73) Assignee: Triple Green Products, Inc., Morris (CA)

(*) Notice: Subject to any disclaimer, the term of this patent is extended or adjusted under 35 U.S.C. 154(b) by 134 days.

(21) Appl. No.: 17/208,108

(22) Filed: Mar. 22, 2021

(65) Prior Publication Data
US 2021/0325039 A1 Oct. 21, 2021

Related U.S. Application Data

(60) Provisional application No. 63/010,187, filed on Apr. 15, 2020.

(51) Int. Cl.
*F23J 15/00* (2006.01)
*B01D 46/02* (2006.01)
(Continued)

(52) U.S. Cl.
CPC ............ *F23J 15/006* (2013.01); *B01D 45/16* (2013.01); *B01D 46/0008* (2013.01);
(Continued)

(58) Field of Classification Search
None
See application file for complete search history.

(56) References Cited

U.S. PATENT DOCUMENTS 2,771,158 A * 11/1956 Bray ..................... C09C 1/487
55/315
2,836,256 A * 5/1958 Caskey ................. B01D 50/00
55/DIG. 32
(Continued)

FOREIGN PATENT DOCUMENTS

CN 105944485 A * 9/2016
CN 106582177 A * 4/2017 ........... B01D 50/002
(Continued)

*Primary Examiner* — Christopher P Jones
*Assistant Examiner* — Brit E. Anbacht
(74) *Attorney, Agent, or Firm* — Christopher J. Dynwoski; Kyle R. Satterthwaite; Ade & Company Inc.

(57) ABSTRACT

A system for treating exhaust gas generated by combustion of biomass comprises a frame, a first cyclonic separation stage supported on the frame and comprising a plurality of parallel gas cyclones in fluidic communication with an inlet receiving the exhaust gas for removing from the exhaust gas particulate matter exceeding a first threshold size, and a second bag filtration stage supported on the frame and comprising a plurality of serially-communicated baghouses each comprising a plurality of bag filters therein for removing, from the partially treated exhaust gas received from the first cyclonic separation stage, particulate matter exceeding a second threshold size that is smaller than the first size which was passed through the first treatment stage. The gas cyclones of the first stage are arranged in a laterally extending row across the frame and the baghouses are arranged in a longitudinally extending row across the frame.

15 Claims, 6 Drawing Sheets

(51) Int. Cl.
- *B01D 45/16* (2006.01)
- *B01D 46/00* (2022.01)
- *B01D 46/44* (2006.01)
- *B01D 46/48* (2006.01)
- *F23J 15/02* (2006.01)
- *B01D 46/58* (2022.01)
- *B01D 46/62* (2022.01)
- *B01D 50/20* (2022.01)

(52) U.S. Cl.
CPC ..... *B01D 46/0013* (2013.01); *B01D 46/0087* (2013.01); *B01D 46/023* (2013.01); *B01D 46/026* (2013.01); *B01D 46/446* (2013.01); *B01D 46/48* (2013.01); *B01D 46/58* (2022.01); *B01D 46/62* (2022.01); *B01D 50/20* (2022.01); *F23J 15/025* (2013.01); *F23J 15/027* (2013.01); *B01D 2258/0283* (2013.01); *B01D 2265/06* (2013.01); *B01D 2267/30* (2013.01); *B01D 2267/70* (2013.01); *B01D 2273/30* (2013.01)

(56) References Cited

U.S. PATENT DOCUMENTS

| | | | | |
|---|---|---|---|---|
| 3,146,080 A * | 8/1964 | Ruble | B01D 50/20 | 95/271 |
| 3,212,237 A * | 10/1965 | Wright | B01D 46/4272 | 95/279 |
| 3,485,671 A * | 12/1969 | Stephens | F24F 13/02 | 55/315 |
| 3,491,518 A * | 1/1970 | Williams | C09C 1/48 | 55/315 |
| 3,780,502 A * | 12/1973 | Dupre | B01D 46/02 | 15/352 |
| 3,870,489 A * | 3/1975 | Shaddock | B04C 9/00 | 15/328 |
| 3,876,402 A * | 4/1975 | Bundy | B01D 46/0013 | 55/379 |
| 3,885,932 A * | 5/1975 | Moore, Jr. | B65F 3/0209 | 55/341.6 |
| 4,062,664 A * | 12/1977 | Dupre | B01D 50/00 | 55/467 |
| 4,134,174 A * | 1/1979 | Flynn | E03F 7/10 | 15/352 |
| 4,227,893 A * | 10/1980 | Shaddock | B60P 1/60 | 55/315 |
| 4,411,674 A * | 10/1983 | Forgac | B01D 46/444 | 55/338 |
| 4,507,130 A * | 3/1985 | Roth | B01D 46/58 | 55/284 |
| 4,574,420 A * | 3/1986 | Dupre | E01H 1/0836 | 15/352 |
| 4,578,840 A * | 4/1986 | Pausch | E01H 1/0836 | 15/340.1 |
| 4,668,253 A * | 5/1987 | Lonardi | B01D 46/71 | 55/303 |
| 4,845,334 A * | 7/1989 | Stocks | F27D 17/004 | 219/121.49 |
| 4,946,483 A * | 8/1990 | Coral | B01D 46/02 | 55/323 |
| 5,002,595 A * | 3/1991 | Kehr | E01H 1/0827 | 55/467 |
| 5,024,681 A * | 6/1991 | Chang | B03C 3/019 | 95/280 |
| 5,030,259 A * | 7/1991 | Bryant | B01D 50/20 | 15/340.1 |
| 5,081,102 A * | 1/1992 | Gay | C04B 35/4504 | 423/594.16 |
| 5,108,471 A * | 4/1992 | Poborsky | E01H 1/0827 | 55/346 |
| 5,402,947 A * | 4/1995 | Petersen | B02C 19/061 | 241/39 |
| 5,405,421 A * | 4/1995 | Swisher, Jr. | B01D 46/70 | 55/284 |
| 6,093,226 A * | 7/2000 | Schoenberger | B01D 46/46 | 96/403 |
| 6,202,330 B1* | 3/2001 | Bolton | B01D 50/20 | 37/195 |
| 6,216,612 B1* | 4/2001 | Hume | B01D 46/48 | 110/165 R |
| 6,309,447 B1* | 10/2001 | Felix | B01D 46/02 | 96/427 |
| 6,471,751 B1* | 10/2002 | Semanderes | B01D 46/76 | 95/271 |
| 6,569,217 B1* | 5/2003 | DeMarco | B01D 50/20 | 96/380 |
| 7,918,908 B2* | 4/2011 | Nahey | B01D 46/04 | 95/280 |
| 8,881,749 B1* | 11/2014 | Smith | B01D 49/00 | 15/301 |
| 2003/0131571 A1* | 7/2003 | Demarco | B01D 45/16 | 55/324 |
| 2005/0022553 A1* | 2/2005 | Abrams | F23G 7/10 | 62/617 |
| 2005/0274094 A1* | 12/2005 | DeMarco | B01D 50/20 | 55/356 |
| 2006/0207230 A1* | 9/2006 | DeMarco | B01D 45/08 | 55/319 |
| 2008/0271420 A1* | 11/2008 | Wellens | A47L 11/4027 | 55/337 |
| 2012/0028200 A1* | 2/2012 | Hicks | F23J 15/027 | 431/173 |
| 2013/0220389 A1* | 8/2013 | Snow | B08B 13/00 | 134/166 C |
| 2014/0165326 A1* | 6/2014 | Tacke | E01H 1/0836 | 15/340.1 |
| 2016/0067644 A1* | 3/2016 | Scaife | B01D 46/0002 | 55/400 |
| 2016/0280480 A1* | 9/2016 | Smith | B65G 69/186 | |
| 2018/0135256 A1* | 5/2018 | Schwartz Franceschini | E01C 19/10 | |
| 2021/0086126 A1* | 3/2021 | Satake | B01D 46/71 | |
| 2021/0325039 A1* | 10/2021 | Maendel | B01D 46/446 | |

FOREIGN PATENT DOCUMENTS

| | | | | |
|---|---|---|---|---|
| CN | 110653058 A * | 1/2020 | ........... | B01D 46/023 |
| CN | 113102074 A * | 7/2021 | ............. | A61L 2/10 |
| CN | 113217919 A * | 8/2021 | | |
| GB | 1487313 A * | 9/1977 | ............. | B01D 46/30 |
| WO | WO-03053544 A2 * | 7/2003 | ............. | B01D 45/16 |
| WO | WO-2017118459 A1 * | 7/2017 | ............. | B01D 45/16 |

\* cited by examiner

SYSTEM FOR REMOVING PARTICULATE MATTER FROM BIOMASS COMBUSTION EXHAUST GAS COMPRISING GAS CYCLONES AND BAGHOUSES

This application claims the benefit under 35 U.S.C. 119(e) of U.S. Provisional Application Ser. No. 63/010,187 filed Apr. 15, 2020.

FIELD OF THE INVENTION

The present invention relates generally to a system for removing particulate matter from exhaust gas generated by combustion of biomass, and more particularly to such a system comprising a plurality of particle separation stages including a cyclone separation stage and a baghouse filtration stage, which is particularly but not exclusively suited for removing substantially all potassium chloride generated by burning poultry litter or waste.

BACKGROUND

Biomass is becoming an increasingly popular form of renewable energy which can be combusted in a furnace to generate heat.

In particular, poultry litter or waste has been found to be an attractive biofuel that is increasingly available as it is a by-product of poultry production which continues to expand worldwide. Thus, for poultry producers, this is a convenient renewable energy source which is readily locally available for production of heat for example for heating facilities which house the poultry production.

Although biomass such as poultry litter is a convenient renewable energy source, combustion of same produces harmful particulate matter such as potassium chloride which is not desirable to emit into the atmosphere along with exhaust gas from the biomass combustion.

SUMMARY OF THE INVENTION

According to an aspect of the invention there is provided a system for removing particulate matter from exhaust gas generated by combustion of biomass comprising:

a frame arranged for resting on a support surface, the frame extending longitudinally between first and second ends and laterally between first and second sides;

an inlet for receiving a flow of the exhaust gas;

a first particle separation stage supported on the frame and comprising a plurality of substantially vertically oriented gas cyclones each configured to form a vortex to separate from the flow of the exhaust gas the particulate matter exceeding a first prescribed threshold size;

the gas cyclones of the first particle separation stage being in parallel fluidic communication with the inlet, the gas cyclones being arranged one beside the other in a generally laterally extending row across the frame;

a second particle separation stage supported on the frame and in fluidic communication with the first particle separation stage so as to receive the flow of the exhaust gas with the particulate matter exceeding the first prescribed threshold size removed therefrom;

the second particle separation stage comprising a plurality of baghouses each including a housing and a plurality of bag filters suspended therein, each baghouse being arranged to separate from the flow of the exhaust gas the particulate matter exceeding a second prescribed threshold size which is smaller than the first Prescribed threshold size;

the baghouses of the second particle separation stage being in series fluidic communication with one another, the baghouses being arranged one beside the other in a generally longitudinally extending row across the frame; and an outlet in fluidic communication with the second particle separate stage for discharging the flow of the exhaust gas with the particulate matter exceeding the second prescribed threshold size removed therefrom.

This arrangement which is particularly but not exclusively suited for treating exhaust gas from combustion of poultry litter provides highly efficient removal of the particulate matter from the combustion exhaust gas before discharge thereof into the atmosphere, while occupying a minimal physical footprint.

Preferably, the bag filters of each baghouse are arranged in a generally laterally extending row within the housing of the baghouse.

Preferably, the baghouses are arranged with the first particle separation stage in a generally common longitudinally extending row across the frame.

Preferably, each baghouse is configured to pass the flow of the exhaust gas from the housing through to insides of the bag filters to remove the particulate matter exceeding the second prescribed threshold size, and the housings of the baghouses are in series fluidic communication.

Preferably, each bag filter comprises a fabric membrane in the form of a bag, which is arranged to prevent passage of the particulate matter exceeding the second prescribed threshold size therethrough, that is supported on an exterior of a support cage generally in the shape of a rectangular prism.

In one such arrangement, the support cage of each bag filter has a length between top and bottom ends, a width between a substantially-parallel opposite pair of narrow faces, and a thickness between a substantially-parallel opposite pair of wide faces, and the width of the support cage is between 7 and 12 times greater than the thickness of the support cage.

In one such arrangement, a length of the support cage of each bag filter between top and bottom ends is between about 22 and about 35 inches.

Preferably, the support cage of each bag filter is generally sheet-like in shape so as to have a substantially-parallel opposite pair of wide faces between which a thickness of the cage is defined and a substantially-parallel opposite pair of narrow faces between which a width of the cage is defined, and a plane of the sheet-like support cage extends in the longitudinal direction of the frame and is parallel to the plane of the adjacent support cage of a common one of the baghouses.

In the illustrated arrangement, the system includes a fan downstream of the second particle separation stage and upstream of the outlet that is configured for generating suction for drawing the flow of the exhaust gas from the inlet to the outlet, the fan being located to one side laterally of a downstream-most one of the baghouses of the second particle separation stage.

In the illustrated arrangement, the fan is carried on a cantilevered platform of the frame arranged to be supported at a spaced height above the support surface.

Preferably, the system further includes a bypass duct which fluidically intercommunicates the first particle separation stage and the outlet so as to guide the flow of the exhaust gas, with the particulate matter exceeding the first prescribed threshold size removed therefrom, to the outlet without passing through the second particle separation stage, and a bypass valve operatively supported in the bypass duct for movement relative thereto between a closed position in which the bypass duct is substantially obstructed to prevent passage of the flow of exhaust gas therethrough and an open position in which the bypass duct is substantially unobstructed to permit passage of the flow of exhaust gas therethrough, wherein the bypass valve is configured so that movement from the closed position to the open position is responsive to detection of a pressure gradient exceeding a prescribed threshold in one of the bag houses.

Preferably, the first and second particle separation stages include collection hoppers arranged to gravitationally convey the removed particulate matter downwardly to bottom discharges of the collection hoppers, the bottom discharges of the collection hoppers of the first and second particle separation stages being communicated with a common conveyor arranged to transfer the removed particulate matter to a collection bin.

In the illustrated arrangement, the conveyor extends underneath the bottom discharges to a discharge end disposed substantially at a periphery of the frame.

In the illustrated arrangement, the frame is arranged to carry the bottom discharges of the collection hoppers at spaced heights above the support surface so that the collection bin can be disposed below the bottom discharges and at least partially within the periphery of the frame.

In the illustrated arrangement, an inlet of each baghouse is located at a height of the bag filters thereof.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show a system indicated at 10 for removing particulate matter from exhaust gas generated by combustion of biomass. In industry this system 10 may be referred to as a scrubber for treating the exhaust gas.

Figure 1:
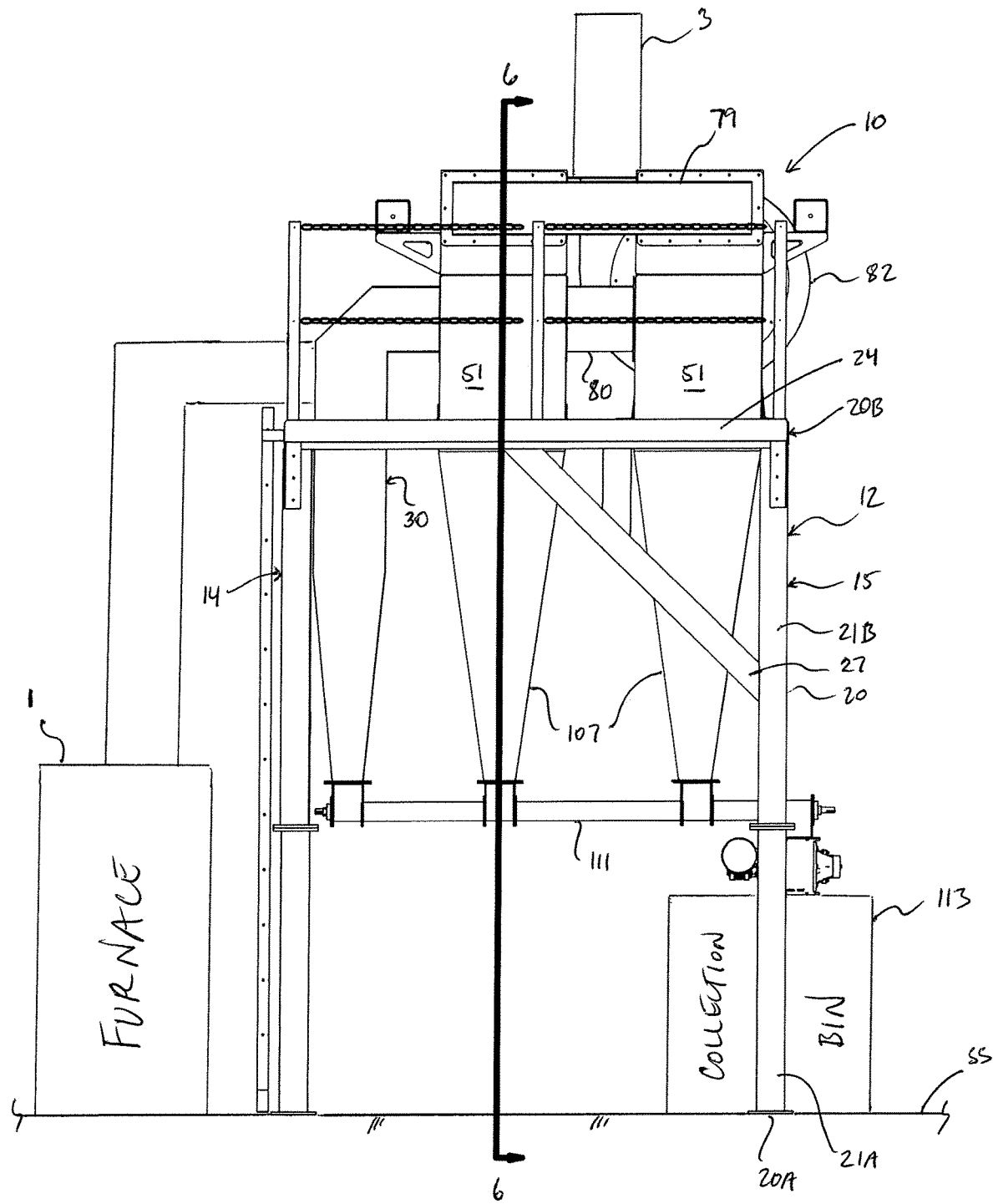
FIG. 1 is a side view of a system for removing particulate matter from biomass combustion exhaust gas according to an arrangement of the present invention.

With reference to FIG. 1, the system 10 is arranged to be disposed in series fluidic communication with a furnace 1 (schematically shown), in which the biomass is combusted, and a chimney or flue 3 (schematically shown) arranged for discharging or expelling the exhaust gas to atmosphere, or more generally the ambient environment. More specifically, the system 10 is located intermediate the furnace 1 and the chimney 3 so that untreated exhaust gas released from the furnace 1 after being passed through a heat exchanger of the furnace can be treated to remove harmful particulates in the form of solid particles, such as potassium chloride, carried by the exhaust gas before the same is discharged to the surrounding environment.

The particulate removal system 10 comprises a frame 12 arranged for resting on a support surface SS defined by, for example, a concrete floor. The frame 12 extends longitudinally between first and second ends 14, 15 and laterally between first and second sides 17, 18. The frame 12 comprises a plurality of legs 20 in spaced relation to each other defining a footprint of the frame on the support surface SS, that is a surface area on the support surface occupied by the frame 12. The legs 20 extend vertically from bottoms 20A arranged for engaging the support surface SS to tops 20B thereof defining a top of the frame. Each of the legs 20 comprises a lower section 21A defining the bottom 20A and an upper section 21B defining the top 20B, which are interconnected.

The legs 20 are interconnected by a laterally opposite pair of longitudinally extending beams 24 arranged at the tops 20B of the legs, an upper pair of longitudinally opposite laterally extending cross members 25 arranged at the tops 20B of the legs and a lower pair of longitudinally opposite laterally extending cross members 26 arranged at an intermediate height between the tops and the bottoms of the legs. A pair of laterally opposite brace members 27 are provided generally at the second end 15 of the frame 12 to interconnect a respective one of the legs 20 and a respective one of the beams 24 adjacent thereto. The foregoing components also form the frame 12.

Figure 3:
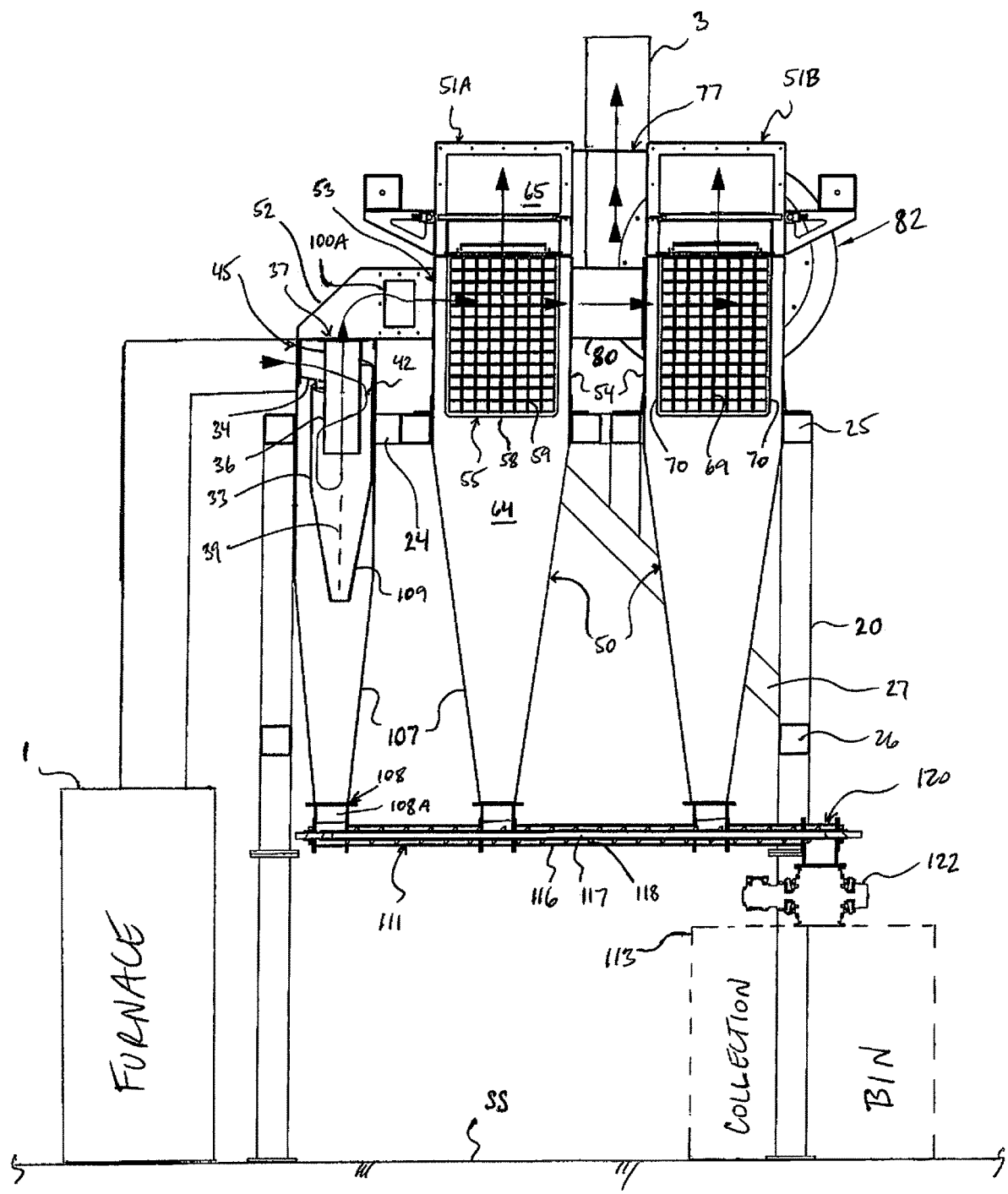
FIG. 3 is a cross-sectional view taken along line 3-3 in FIG. 4.

On the frame there is supported a first particle separation stage 30 which comprises a plurality of gas cyclones 31 for providing a first coarse particle removal step of the treatment process performed by the system 10 on the combustion exhaust gas. Referring to FIG. 3, the gas cyclones 31 are of a conventional design each comprising a generally cylindrical outer housing 33 defining an inlet 34 of the cyclone and an inner generally cylindrical duct 36 defining an outlet 37 of the cyclone that is substantially coaxial with the outer housing 33. An axis 39 of the cyclone which is encompassed by the outer housing 33 is substantially vertically oriented such that a stream of gas admitted into the housing 33 through the inlet 34 is guided in a generally horizontal direction, tangentially of the axis 39, and the gas stream is emitted from the cyclone 31 in a generally vertical direction substantially coaxially of the cyclone.

The substantially conventional gas cyclones 31 are configured to form a vortex within the outer housing 33, as represented by a path of arrow 42 showing flow of the exhaust gas in the cyclone, to separate from the exhaust gas flow particulate matter which exceeds a first prescribed threshold size.

Figure 4:
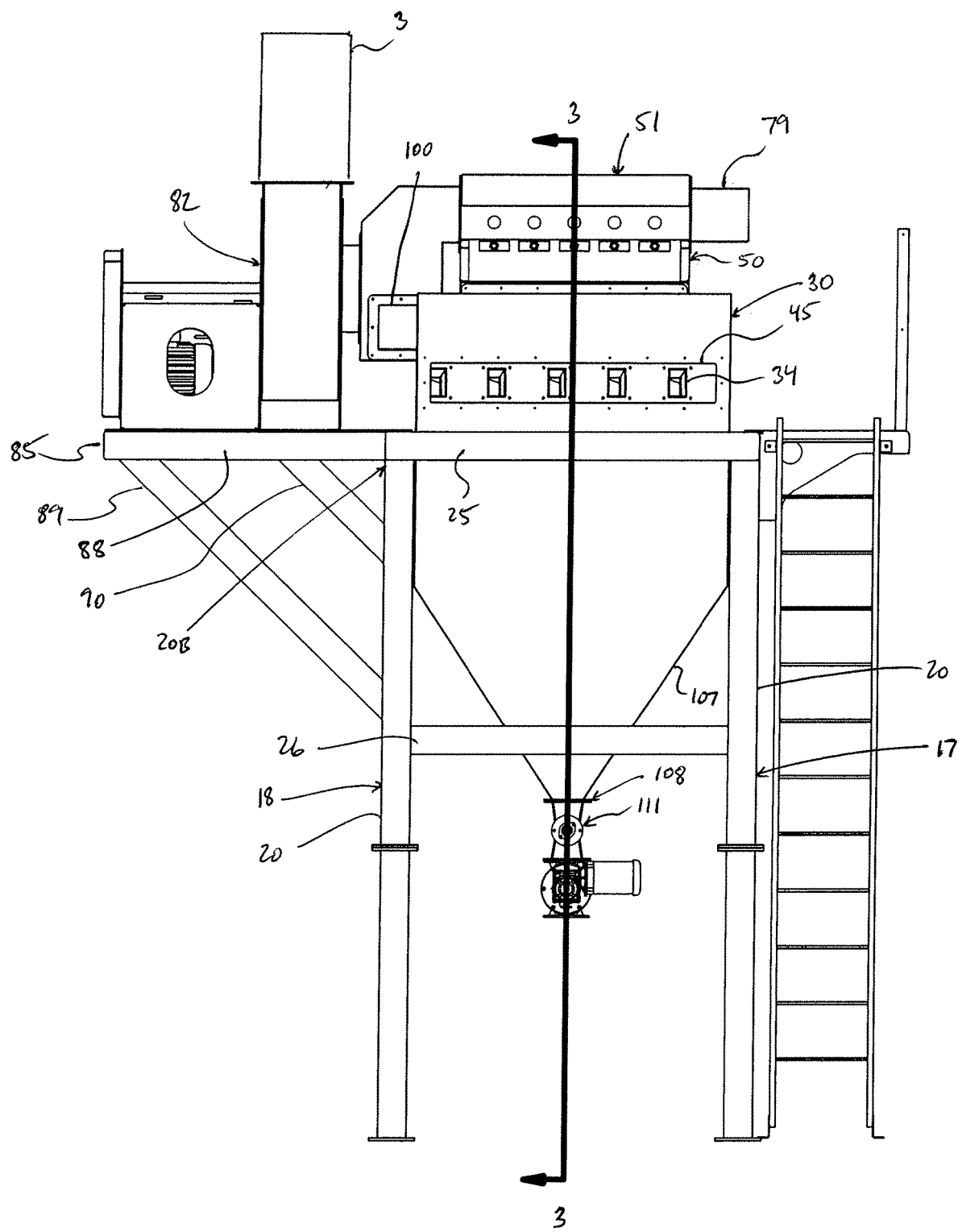
FIG. 4 is an end view of the system of FIG. 1.

Referring to FIG. 4, the inlets 34 of the gas cyclones 31 are fluidically communicated with a common inlet 45 of the system which in turn is in fluidic communication with the furnace 1. Thus all of the gas cyclones 31 of the first particle separation stage 30 are in parallel fluidic communication with the inlet 45 so as to each receive a portion of an input flow of the exhaust gas received by the system 10 for substantially simultaneous treatment.

As such, the substantially vertically oriented gas cyclones 31 are arranged one beside the other in a generally laterally extending row across the frame 12 such that the first particle separation stage 30 occupies a minimum amount of space within the frame 12.

The cyclonic separation stage 30 is suited as the first particulate removal stage in the system 10 receiving untreated exhaust gas because the gas cyclones 31 comprise non-combustible metallic components which are well suited for preventing sparks, which are emitted by the combustion of the flammable biomass and carried with the exhaust gas, from continuing to stages and components of the system 10 which are downstream of the cyclones 31 relative to the flow of exhaust gas through the system 10.

To remove finer solid particles carried by the exhaust gas, the system 10 includes a second particle separation stage 50 which comprises a plurality of baghouses 51 for providing a second fine particle removal step of the treatment process performed by the system 10 on the combustion exhaust gas. The second particle separation stage 50 is supported on the frame 12 and is in fluidic communication with the first particle separation stage 30 so as to receive the flow of the exhaust gas with the particulate matter exceeding the first prescribed threshold size removed therefrom, or in other words, receiving the exhaust gas containing particulate matter which is substantially no larger than the first prescribed threshold size. More specifically, the outlets 37 of the gas cyclones 31 are in parallel fluidic communication with the second particle separation stage 50 which is downstream of the cyclones 31 via duct 52 which extends upwardly and longitudinally from the outlets 37 to an inlet 53 of the second bag filtration stage 50.

The baghouses 51 of the second stage 50 are of a generally conventional design and are arranged in series fluidic communication with one another so that the exhaust gas flow received from the first particle separation stage 30 is initially admitted into an upstream-most one of the baghouses indicated at 51A, which defines the inlet of the second stage 50, before eventually flowing to a subsequent downstream one of the baghouses 51B. Despite their series fluidic arrangement, the multiple baghouses 51 substantially work in parallel to treat the exhaust gas such that providing more than one baghouse acts to increase a maximum flow rate of gas which can be treated by the system 10, similarly to providing multiple parallel gas cyclones 31.

The series baghouses 51 are arranged one beside the other in a generally longitudinally extending row across the frame 12 so that the second particle separation stage 50 occupies a minimum amount of space within the frame 12. Furthermore, the upstream-most baghouse 51 is disposed on the frame in adjacent relation to the cyclonic separation stage 30.

Figure 2:
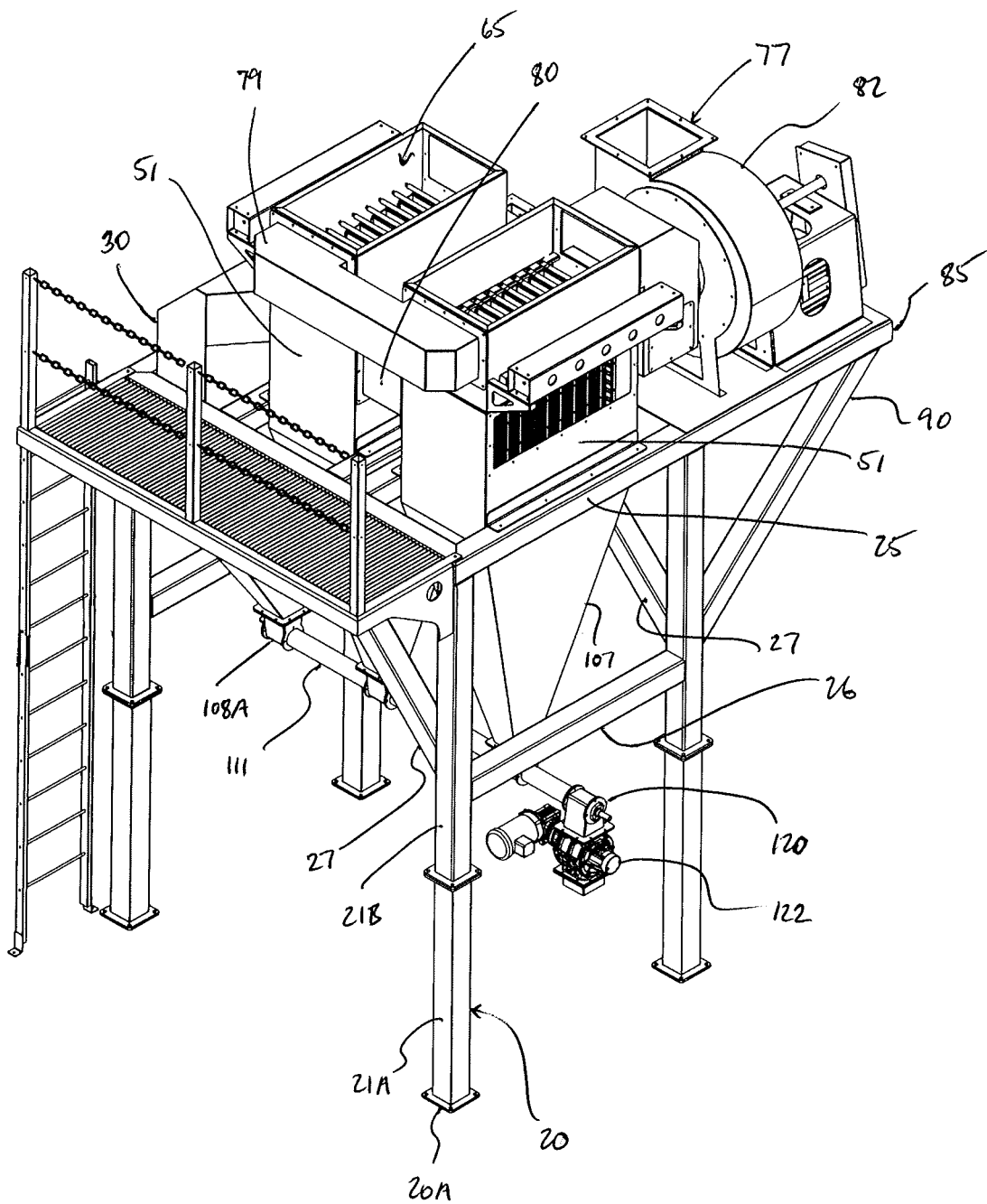
FIG. 2 is a perspective view of the system of FIG. 1, where some components are omitted for convenience of illustration or to show parts which are otherwise hidden.

Each conventional baghouse comprises a housing 54 and a plurality of bag filters 55 suspended therein. Each baghouse 51 is arranged to separate, from the flow of the partially treated exhaust gas, particulate matter which exceeds a second prescribed threshold size smaller than the first prescribed threshold size already removed from the exhaust gas by the first particle separation stage 30. It will be appreciated that the housings 54 of the baghouses 51 are substantially enclosed although they are shown for example in FIGS. 2 and 5 as open at their tops above the bag filters 55 which is for the purpose of showing internal features of the baghouses 51, such as the bag filters 55, which are otherwise hidden from view.

Each baghouse 51 is of the pulse-jet type meaning that the baghouse is configured to pass the flow of the exhaust gas from the housing 54 surrounding the bag filters 55 supported inside same, to which the gas flow is input, through to insides of the bag filters 55 to remove the particulate matter exceeding the second prescribed threshold size, leaving the same on outsides of the filters 55. Thus, more specifically it is the housings 54 of the baghouses that are in series fluidic communication to enable passage of the exhaust gas input to the second particle separation stage 50 to each of the baghouses 51.

Each bag filter 55 comprises an outer fabric membrane 58 in the form of a bag, which is arranged to prevent passage of the particulate matter exceeding the second prescribed threshold size therethrough, and an internal support cage 59 providing structural support for the bag 58 and defining a plurality of openings to enable passage from the selectively permeable fabric membrane 58 through to an interior of the individual bag filter that is delimited by the cage. The support cage 59 has a top hanger portion configured for mounting to a support portion 62 of the housing 54 defining a plurality of slots into which each of the bag filters 55 can be lowered. The support portion 62 forms a divider wall which separates the housing 54 into an input chamber 64 to which dirty gas is confined, that is the exhaust gas carrying the particulate matter including particles greater than the second threshold size, and an output chamber 65 which is fluidically communicated with the insides of the bag filters 55 to receive the exhaust gas with the foregoing particles removed therefrom. The insides of the bag filters 55 are fluidically communicated with the input chamber but the fabric membrane 58 provides selective transmission of particles smaller no larger than the second prescribed size through to the output chamber 65.

Thus each baghouse 51 comprises a plurality of the bag filters 55 to increase a maximum flow rate of the exhaust gas which can be treated by the respective baghouse. The bag filters 55 of each baghouse are arranged in a generally laterally extending row within the housing 54 of the baghouse, that is in a direction cross-wise to the longitudinal arrangement of the baghouses 51, so as to minimize a footprint of the respective baghouse. This mirrors the lateral arrangement of the constituent gas cyclones 31 of the first stage 30.

To further reduce the overall footprint of the system 10 comprising only two particle separation stages 30 and 50 for the purposes of removing substantially all of the harmful particulate in the exhaust gas before discharge to the atmosphere, the baghouses 51 are arranged with the first particle separation stage 30 in a generally common longitudinally extending row across the frame 12.

Returning now to the baghouses 51, in order to increase the maximum flow rate of gas which can be treated thereby, the support cages 59 which carry the bag-like membranes 58 on their exteriors are each generally in the shape of a rectangular prism instead of the conventional circular cylindrical shape.

More specifically, the support cage 59 which is generally in the shape of a rectangular prism is substantially planar like a sheet so as to have a substantially-parallel opposite pair of wide faces 69 between which a thickness of the cage is defined and a substantially-parallel opposite pair of narrow faces 70 between which a width of the cage is defined. The thickness of the cage 59 is substantially smaller in size than the width of the support cage which is between 7 and 12 times greater than the thickness of the support cage, and preferably between 8 and 10 times greater than the thickness of the support cage. Also, a length of the cage 59 between top and bottom ends 73, 74 is between about 1.2 and about 2 times greater than the cage width, and preferably between about 1.4 and about 1.6 times greater than the cage width. Generally speaking, the length of the support cage is between about 22 and about 35 inches, and preferably between about 25 and about 30 inches. In at least one arrangement, the support cage is 28 inches long, 18 and ⅝ inches wide, and 2 inches thick.

Figure 5:
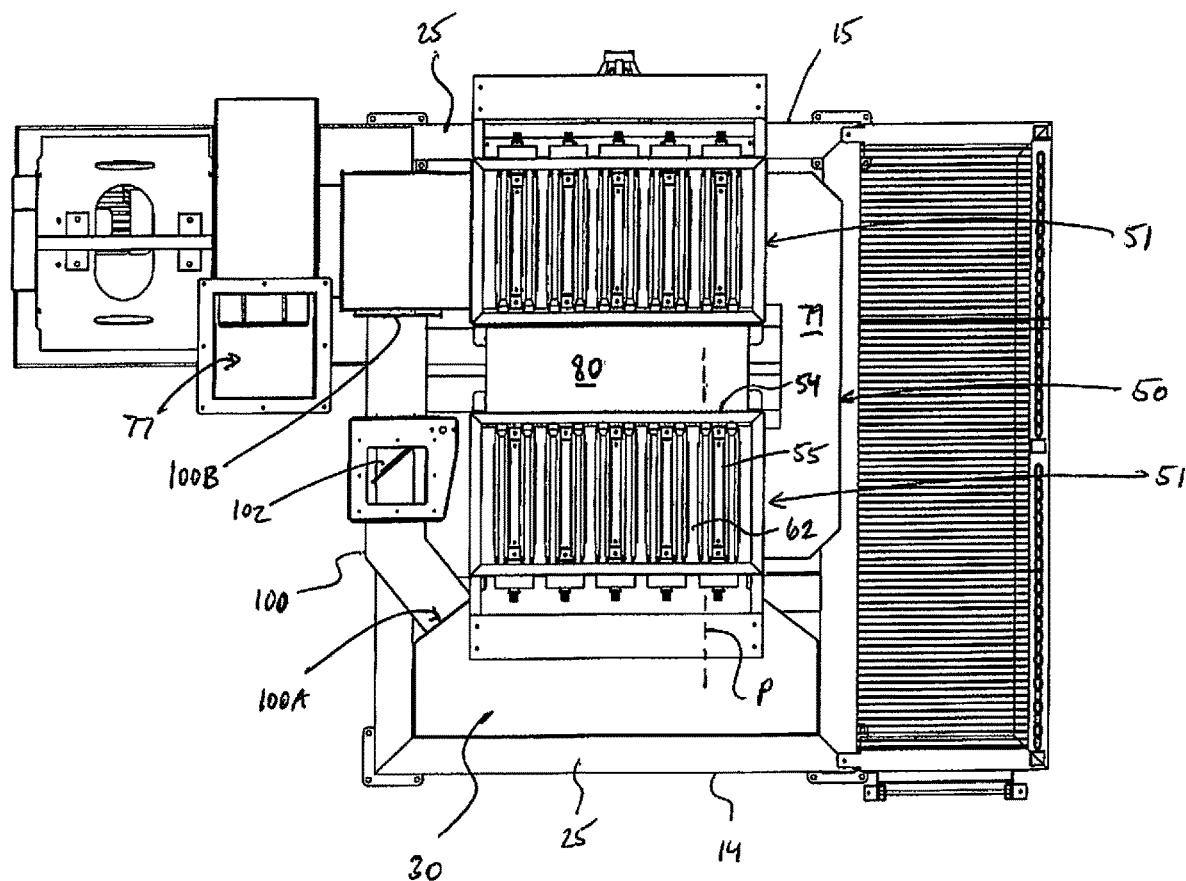
FIG. 5 is a top plan view of the system of FIG. 1, where some components are omitted for convenience of illustration or to show parts which are otherwise hidden, and a portion of a bypass duct is shown as transparent to show an otherwise hidden bypass valve therein.
Figure 6:
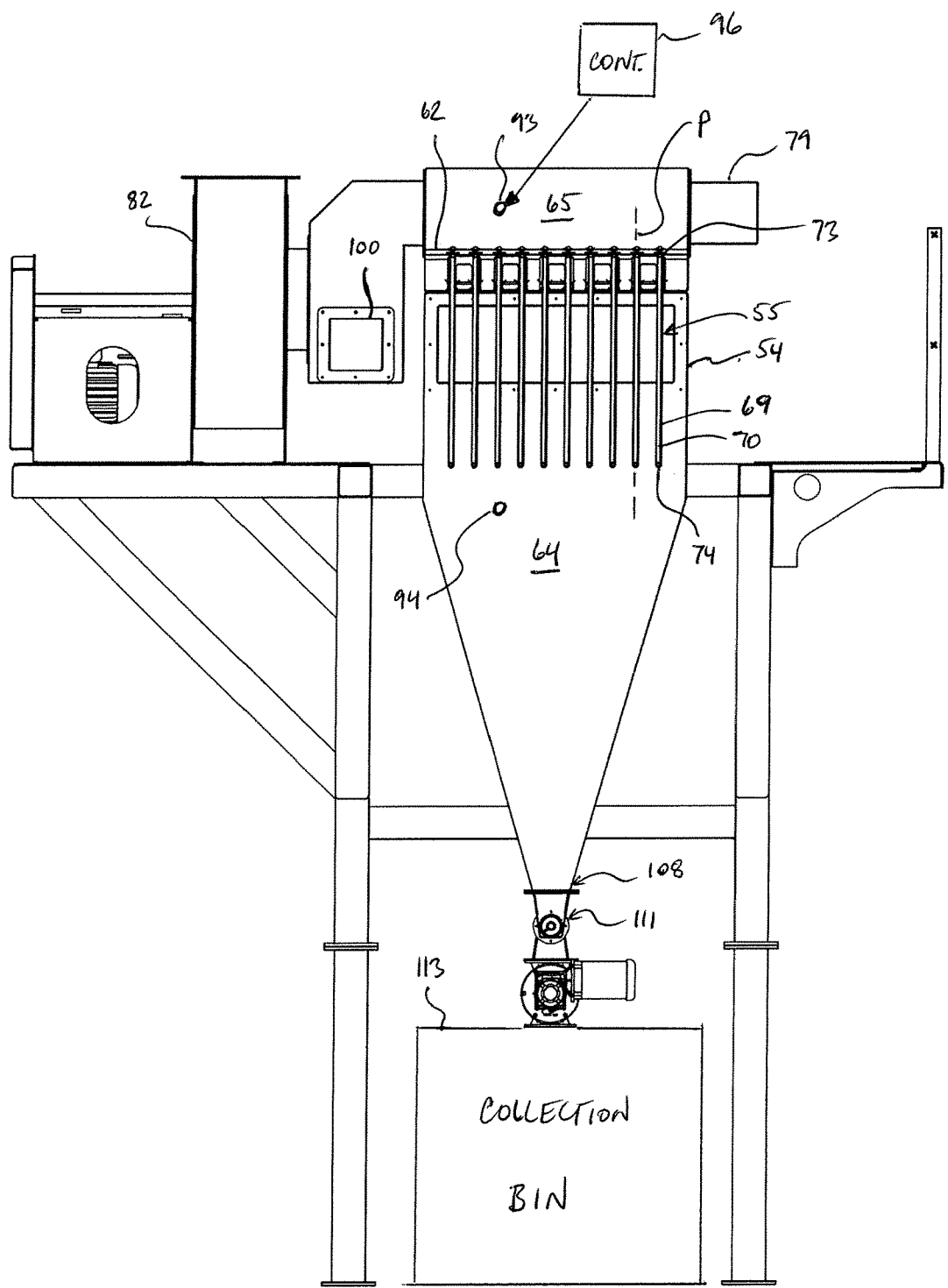
FIG. 6 is a cross-sectional view along line 6-6 in FIG. 1.

A plane P of the sheet-like support cage 59, as more clearly shown in FIGS. 5-6, which is substantially vertically oriented, extends in the longitudinal direction of the frame 12 and is parallel to the plane P of the adjacent support cage 59 of a common one of the baghouses. This further minimizes a volumetric size of the baghouse 51.

The output chambers 65 of the baghouses 51 are in fluidic communication with an outlet 77 of the system for discharging the flow of the exhaust gas with the particulate matter exceeding the second prescribed threshold size removed therefrom. In the illustrated arrangement, a duct 79 is provided to fluidically intercommunicate the output chambers 65 of the series baghouses 51 such that the system outlet 77 can be directly fluidically communicated with the downstream-most baghouse 51B.

It also will be appreciated that the input chambers 64 of the baghouses are fluidically communicated by duct 80 so that the partially treated exhaust gas from the first cyclonic separation stage 30 is admitted to both serially-arranged baghouses 51 for substantially simultaneous treatment by bag filters 55 before discharge from the output chambers 64 to the outlet 77.

It will also be appreciated that the inlet 53 and the duct 80 which defines an inlet to the downstream baghouse 51B are located closer to a top of the input chamber 64 than to a bottom thereof, and preferably at the top therefor at the divider wall 62 from which the bag filters 55 hang, so that the input partially-treated exhaust gas is guided across the bank of plural bag filters 55 parallel to the planes P thereof. As such the inlet of each baghouse 51 is located closer to a top of the housing 54 than to a bottom thereof so as to be located at a height of the bag filters 55 so that the exhaust gas flow is substantially horizontally directed across the housing 54, and directed substantially normal to a direction of the flow of treated gas through the bag filters 55 to the output chamber 65.

The system 10 includes a fan 82 arranged downstream of the second particle separation stage 50 and upstream of the outlet 77, which is configured for generating suction for drawing the flow of the exhaust gas from the inlet 45 to the outlet 77 and through the serially-arranged particle separation stages 30, 50. The fan 82 is mounted on the frame 12 so as to be located to one side laterally of the downstream-most baghouse 51B that is opposite to the duct 79 disposed on the other lateral side of the baghouses 51.

More specifically, the fan 82 is carried on a cantilevered platform 85 of the frame 12 which is arranged to be supported at a spaced height above the support surface SS. The cantilevered platform 85 is formed by a pair of laterally extending cross-members arranged at the tops 20B of the legs, which extend past the side 18 of the frame as defined by the legs 20 that are located on that side 18. One of the foregoing laterally extending cross-members is defined by one of the end cross-members 25 that is located on the end 15 of the frame, which extends beyond the side 18, and a distinct cross-member 88 connected at an intermediary location to one of the longitudinal beams 24 that is on the side 18. Each of the frame members 25, 88 defining the cantilevered platform 85 are braced by a distinct inclined support member 89, 90. The frame members 25, 88 are interconnected at their distal ends to the frame side 18.

As more clearly shown in FIG. 6, the system 10 further includes a set of sensors schematically shown at 93, 94 disposed in each of the baghouses 51 for measuring a pressure gradient between the input and output chambers 64, 65 of the baghouse. Generally speaking, there will exist a difference in pressure between these two chambers as the bag filters 55 act to restrict the flow of the exhaust gas from the input chamber 64 to the output chamber 65.

The pressure sensors 93, 94 are operatively associated with a controller 96 (schematically shown) for communication therewith. For convenience of illustration, the controller 96 is shown in FIG. 6 as communicating only with one of the sensors, specifically that indicated at 93, although it will be appreciated that it communicates with both pressure sensors.

The controller 96 is configured to monitor the measured pressure gradient determined by pressure measurements obtained from the sensors 93, 94 to check whether the measured gradient in one of the baghouses 51 has exceeded a prescribed threshold value.

That is, it will be appreciated that in accordance with the generally conventional pulse-jet arrangement of the baghouses 51, each baghouse 51 is configured to periodically inject a short burst of pressurized air into each bag filter 55 so as to dislodge the particulate which has collected on the exterior of the fabric member 58, thereby automatically periodically cleaning the filters.

However, in the event that the automatic cleaning feature is not effective, the pressure gradient between the two chambers 64, 65 of a common baghouse 51 may increase above a safe level. In this case, the operation of the baghouse 51 would need to be interrupted for inspection or manual cleaning.

To enable continuous operation of the particulate removal system 10 in the event that maintenance work has to be performed on the baghouses 51 of the second particle separation stage 50, the system 10 additionally includes a bypass duct 100 which fluidically intercommunicates the first particle separation stage 30 and the outlet 77 so as to guide the flow of the exhaust gas, with the particulate matter exceeding the first prescribed threshold size removed therefrom, to the outlet 77 without passing through the second particle separation stage 50. More specifically, an inlet 100A of the bypass duct is communicated with the duct 52 which is at an intermediate location between the first stage 30 and the second stage 50, and an outlet 100B of the bypass duct is communicated with ducting at an intermediate location between the fan 82 and the second particle separation stage 50. Thus the system 10 can continue to operate by at least partially treating the exhaust gas by applying cyclonic separation thereto.

A bypass valve 102 is operatively supported in the bypass duct 100 for movement relative thereto between a closed position in which the bypass duct 100 is substantially obstructed to prevent passage of the flow of exhaust gas therethrough, for example during normal operation so that the flow of exhaust gas is forced to pass through both particle separation stages 30 and 50 to remove substantially all of the particulate therefrom, and particularly the potassium chloride, before being exhausted to atmosphere, and an open position in which the bypass duct is substantially unobstructed to permit passage of the flow of exhaust gas therethrough, such as when maintenance on the baghouses 51 needs to be performed. The bypass valve 102 is configured so that movement from the closed position to the open position is responsive to detection by controller 96 of the pressure gradient exceeding the prescribed threshold in one of the baghouses. Therefore, the bypass valve 102 is operatively associated or coupled with the controller 96 which actuates movement of the valve to the open position, and also back to the closed position once the baghouses 51 have been cleaned so as to be returned to operation.

In regard to removal of the particulate which has been separated from the exhaust gas passing through the system 10, the first and second particle separation stages 30, 50 include bottom collection hoppers 107 arranged to gravitationally convey the removed particulate matter downwardly to bottom discharges 108 of the collection hoppers. Furthermore, each gas cyclone 31 of the first separation stage 30 has a bottom hopper portion 109 to gravitationally urge the separated particulate towards a common collection hopper 107 which is in communication with all of the gas cyclones of the first stage 30. The bottom discharges 108 of the first and second particle separation stages 30, 50 are selectively communicated via an air lock 108A (schematically shown) with a common conveyor 111 which is arranged to transfer the removed particulate matter to a collection bin 113. The air locks 108A enable each particle separation stage to remain suitably pressurized in order to suitably treat the exhaust gas. The air locks 108 are operatively associated with the controller 96 to actuate the same.

The bottom discharges 108 of the collection hoppers lie along a common longitudinally extending axis located laterally centrally of the frame so that a single conventional screw conveyor 111 can be provided to move the separated particulate to the collection bin 113. This arrangement is made easier as the parallel gas cyclones of the first particle separation stage 30 and the baghouses 51 are all arranged in a common longitudinally extending row.

The screw conveyor 111 comprises a tubular housing 115, a shaft 116 supported for driven rotation inside the housing, and a helical flight 117 connected to the rotatable shaft. The conveyor 111 extends underneath the bottom discharges 108 to a discharge end 120 of the conveyor which is disposed substantially at a periphery of the frame 12 as more clearly shown in FIG. 3. Each collection hopper discharge 108 is communicated with the housing 115 of the conveyor at an axially spaced position from an adjacent one of the bottom discharges 108. An air lock 122 is provided at the conveyor discharge end 115 to selectively fluidically communicate the conveyor housing 116 and the collection bin 113.

As more clearly shown in FIGS. 1 and 3, the frame 12 is arranged to carry the bottom discharges 108 of the collection hoppers 107 at spaced heights above the support surface SS so that the collection bin 113 can be disposed below the bottom discharges and at least partially within the periphery of the frame, as more clearly shown in FIG. 3, where the bin 113 is located between the legs 20 at the second end 15 of the frame. This further reduces the overall footprint of the system with the waste particulate collection system provided by the conveyor 111 and collection bin 113. The collected particulate, for example, may be recycled as fertilizer.

This arrangement which is particularly but not exclusively suited for treating exhaust gas from combustion of poultry litter provides highly efficient removal of the particulate matter from the combustion exhaust gas before discharge thereof into the atmosphere, while occupying a minimal physical footprint.

In use, once the exhaust gas is generated by the combustion of biomass in the furnace 1, the untreated exhaust gas is guided into the particulate removal system 10 through the inlet 45. Upon entering the system 10, the exhaust gas is passed through the first particle removal stage 30 where cyclonic separation is applied to the exhaust gas to separate therefrom the particles which exceed the first prescribed threshold size.

The partially treated exhaust gas is subsequently guided to the second particle separation stage 50 where it is serially admitted into each of the constituent baghouses 51 of the second stage 50.

At the second stage 50, mechanical filtration is applied to the exhaust gas to further remove therefrom particles which exceed the second prescribed threshold size but which are no larger than the first prescribed threshold size which were permitted to be passed to the second stage 50 by the first particle separation stage 30.

The mechanically dry filtered exhaust gas is subsequently guided to the outlet 77 where it is discharged to the ambient environment.

During normal operation of the system to treat the exhaust gas progressively using the multiple particle separation stages 30, 50, the bag filters 55 of the baghouses 51 are periodically cleaned by injecting pressurized air into the bag filters.

The separated particulate eventually gravitationally settles and is gravitationally conveyed to bottom discharges 108 of the collection hoppers 107 of each particle separation stage.

In the event that the pressure gradient in any one of the baghouses is detected as exceeding the prescribed threshold pressure gradient, the bypass valve 102 is actuated by the controller 96 to provide an auxiliary flow path directly from the output of first particle separation stage 30 to the outlet 77.

In other words, the system 10 provides a two stage particle separation process to remove unwanted potassium chloride from high temperature, combustion air exhaust.

High temperature flue gases are pulled into the top of the first stage 30 of the system at high speed, where the gases are subjected to cyclonic, centrifugal forces that push the heavy, larger particles and sparks out of the air stream against the wall of the cyclone. The particles then fall into a collection hopper which has an air lock that opens to a screw auger which takes the particles to a collection bin. The position of the exhaust port and the cyclonic hopper within the first stage hopper provide a high recovery rate for the separated particulate.

The second stage 50 is a dual pass bag filter system which has pneumatic, self-cleaning filter banks for the removal of fine dust particles. The pneumatic cleaning system is on a set timer which can be adjusted as needed through a PLC controller. With a small vacuum these particles are then dropped into the collection hoppers. The airlock located on the bottom of each hopper opens to unload the particles into a screw auger which takes the particles to the collection bin. The airlock are controlled by the PLC in an electrical panel of the system 10.

Together, these stages combine to form a self-contained, low vacuum, sealed system which treats the exhaust gas to remove substantially all of the particulate initially carried thereby.

Accordingly, one benefit of the illustrated arrangement is a system which yields valuable, resalable or reusable fertilizer product that can be safely reintroduced into the plant growing cycle.

The system can be retrofitted to almost any existing biomass boiler system.

The system can also be used in other applications where such a process is needed, that is for exhaust gas treatment to remove particle particularly potassium chloride.

Exhaust gas from combustion devices is hot, moist and heavily laden with potassium chloride particulate as it leaves the combustion exhaust chamber. When it enters the cooler exhaust/chimney zone, it begins to condense.

These operating conditions present a variety of problems for electrostatic precipitators and wet scrubbers such as clogging/plugging up and corrosive liquid byproducts.

A typical baghouse filter system has a very large footprint unlike our small footprint. It usually pulls air in through the bottom of the structure where larger particles drop out of the air stream and smaller particles are filtered out by the bags situated near the outlet.

The Environmental Protection Agency (EPA) wants to eliminate air borne contaminants, issues with dangerous land fill waste product and liquid byproducts that can find their way into local waterways that feed into major bodies of water causing toxic algae blooms. The illustrated arrangement of exhaust gas treatment system removes these contaminants when burning waste products, that is poultry litter, which acts to produce energy.

The scope of the claims should not be limited by the preferred embodiments set forth in the examples but should be given the broadest interpretation consistent with the specification as a whole.

The invention claimed is:

1. A system for removing particulate matter from exhaust gas generated by combustion of biomass comprising:
    a frame arranged for resting on a support surface, the frame extending longitudinally between first and second ends and laterally between first and second sides;
    an inlet for receiving a flow of the exhaust gas;
    a first particle separation stage supported on the frame and comprising a plurality of substantially vertically oriented gas cyclones each configured to form a vortex to separate from the flow of the exhaust gas the particulate matter exceeding a first prescribed threshold size;
    the gas cyclones of the first particle separation stage being in parallel fluidic communication with the inlet, the gas cyclones being arranged one beside the other in a generally laterally extending row across the frame;
    a second particle separation stage supported on the frame and in fluidic communication with the first particle separation stage so as to receive the flow of the exhaust gas with the particulate matter exceeding the first prescribed threshold size removed therefrom;
    the second particle separation stage comprising a plurality of baghouses each including a housing and a plurality of bag filters suspended therein, each baghouse being arranged to separate from the flow of the exhaust gas the particulate matter exceeding a second prescribed threshold size which is smaller than the first prescribed threshold size;
    the baghouses of the second particle separation stage being in series fluidic communication with one another, the baghouses being arranged one beside the other in a generally longitudinally extending row across the frame; and
    an outlet in fluidic communication with the second particle separate stage for discharging the flow of the exhaust gas with the particulate matter exceeding the second prescribed threshold size removed therefrom.

2. The system of claim 1 wherein the bag filters of each baghouse are arranged in a generally laterally extending row within the housing of the baghouse.

3. The system of claim 1 wherein the baghouses are arranged with the first particle separation stage in a generally common longitudinally extending row across the frame.

4. The system of claim 1 wherein each baghouse is configured to pass the flow of the exhaust gas from the housing through to insides of the bag filters to remove the particulate matter exceeding the second prescribed threshold size, and the housings of the baghouses are in series fluidic communication.

5. The system of claim 1 wherein each bag filter comprises a fabric membrane in the form of a bag, which is arranged to prevent passage of the particulate matter exceeding the second prescribed threshold size therethrough, that is supported on an exterior of a support cage generally in the shape of a rectangular prism.

6. The system of claim 5 wherein the support cage of each bag filter has a length between top and bottom ends, a width between a substantially-parallel opposite pair of narrow faces, and a thickness between a substantially-parallel opposite pair of wide faces, and the width of the support cage is between 7 and 12 times greater than the thickness of the support cage.

7. The system of claim 5 wherein a length of the support cage of each bag filter between top and bottom ends is between about 22 and about 35 inches.

8. The system of claim 5 wherein the support cage of each bag filter is generally sheet-like in shape so as to have a substantially-parallel opposite pair of wide faces between which a thickness of the cage is defined and a substantially-parallel opposite pair of narrow faces between which a width of the cage is defined, and a plane of the sheet-like support cage extends in the longitudinal direction of the frame and is parallel to the plane of the adjacent support cage of a common one of the baghouses.

9. The system of claim 1 further including a fan downstream of the second particle separation stage and upstream of the outlet that is configured for generating suction for drawing the flow of the exhaust gas from the inlet to the outlet, the fan being located to one side laterally of a downstream-most one of the baghouses of the second particle separation stage.

10. The system of claim 9 wherein the fan is carried on a cantilevered platform of the frame arranged to be supported at a spaced height above the support surface.

11. The system of claim 1 further including a bypass duct which fluidically intercommunicates the first particle separation stage and the outlet so as to guide the flow of the exhaust gas, with the particulate matter exceeding the first prescribed threshold size removed therefrom, to the outlet without passing through the second particle separation stage, and a bypass valve operatively supported in the bypass duct for movement relative thereto between a closed position in which the bypass duct is substantially obstructed to prevent passage of the flow of exhaust gas therethrough and an open position in which the bypass duct is substantially unobstructed to permit passage of the flow of exhaust gas therethrough, wherein the bypass valve is configured so that movement from the closed position to the open position is responsive to detection of a pressure gradient exceeding a prescribed threshold in one of the baghouses.

12. The system of claim 1 wherein the first and second particle separation stages include collection hoppers arranged to gravitationally convey the removed particulate matter downwardly to bottom discharges of the collection hoppers, the bottom discharges of the collection hoppers of the first and second particle separation stages being communicated with a common conveyor arranged to transfer the removed particulate matter to a collection bin.

13. The system of claim 12 wherein the conveyor extends underneath the bottom discharges to a discharge end disposed substantially at a periphery of the frame.

14. The system of claim 12 wherein the frame is arranged to carry the bottom discharges of the collection hoppers at spaced heights above the support surface so that the collection bin can be disposed below the bottom discharges and at least partially within the periphery of the frame.

15. The system of claim 1 wherein an inlet of each baghouse is located at a height of the bag filters thereof.

* * * * *

UNITED STATES PATENT AND TRADEMARK OFFICE
CERTIFICATE OF CORRECTION

PATENT NO. : 11,662,093 B2
APPLICATION NO. : 17/208108
DATED : May 30, 2023
INVENTOR(S) : David Maendel It is certified that error appears in the above-identified patent and that said Letters Patent is hereby corrected as shown below:

In the Claims

In Claim 1, at Column 11, Lines 56-57, the expression "second particle separate stage" should read --second particle separation stage--.

Signed and Sealed this
First Day of August, 2023

Katherine Kelly Vidal
Director of the United States Patent and Trademark Office